B. W. WEATHERSPOON.
HARROW.
APPLICATION FILED OCT. 2, 1916.
1,241,064.
Patented Sept. 25, 1917.
2 SHEETS—SHEET 1.
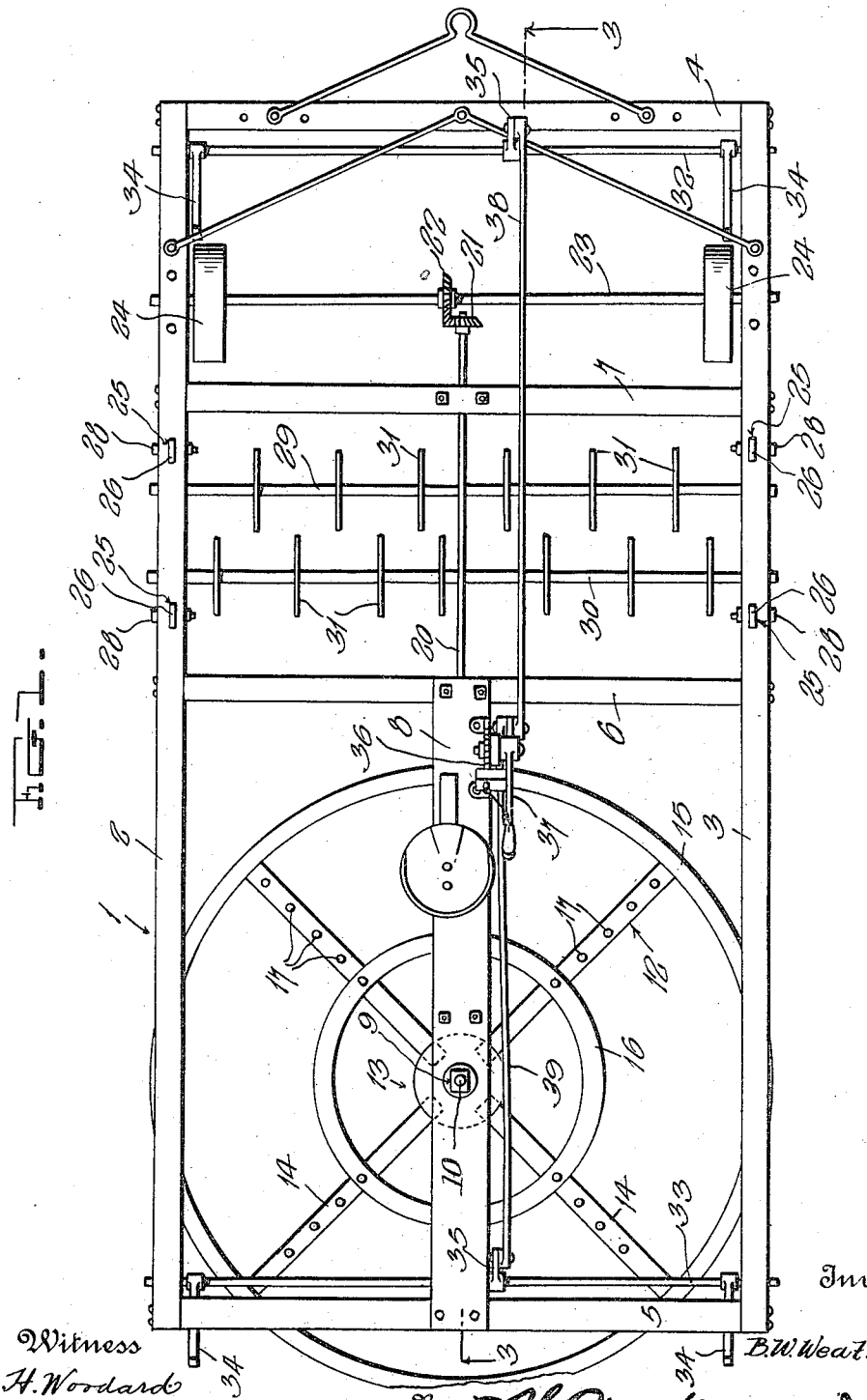
Witness
H. Woodard
Inventor
B. W. Weatherspoon
By H. B. Willson & Co.
Attorneys B. W. WEATHERSPOON.
HARROW.
APPLICATION FILED OCT. 2, 1916.
1,241,064.
Patented Sept. 25, 1917.
2 SHEETS—SHEET 2.
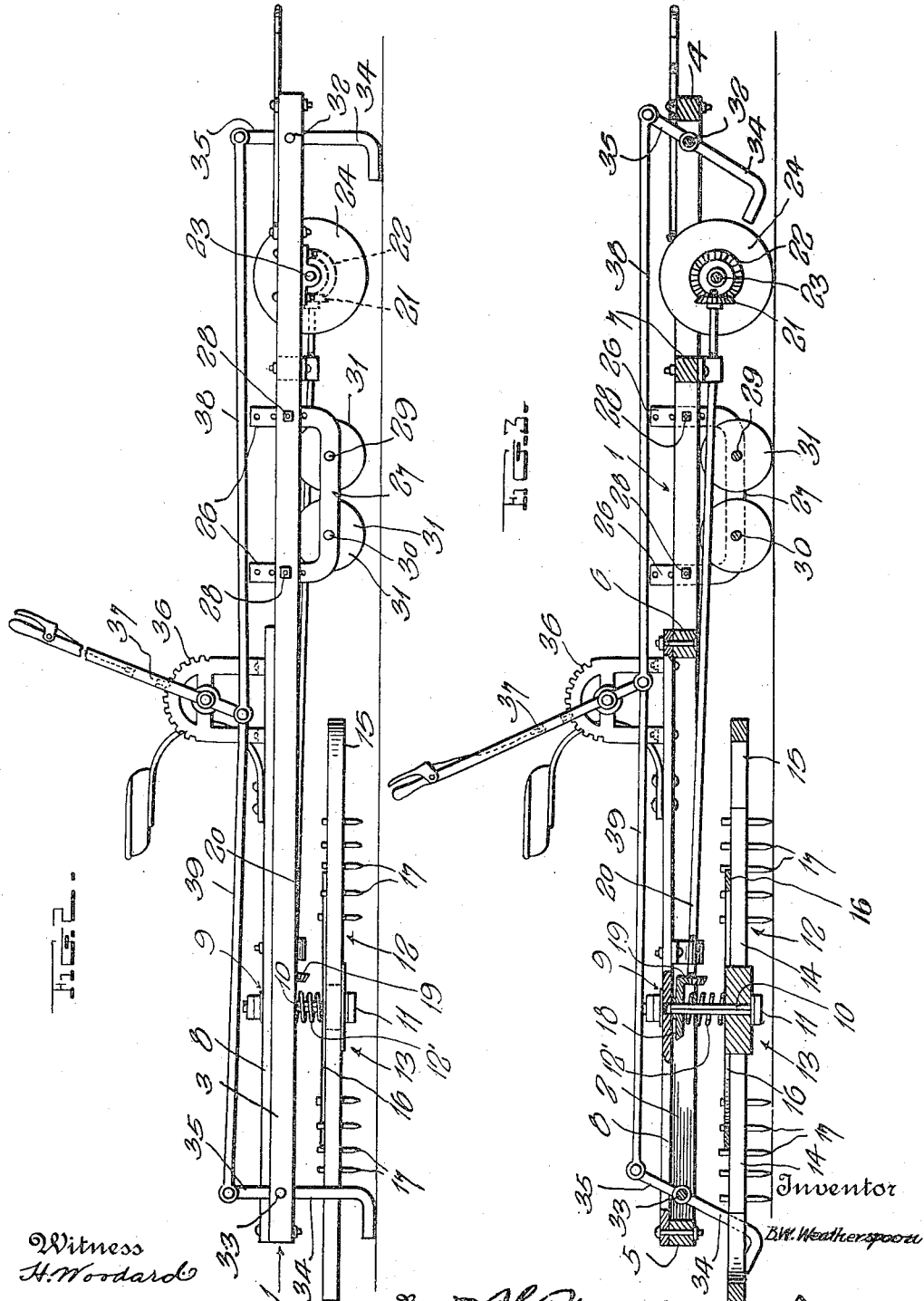

UNITED STATES PATENT OFFICE.

BENJAMIN W. WEATHERSPOON, OF SNYDER, OKLAHOMA.

HARROW.

1,241,064.  Specification of Letters Patent.  Patented Sept. 25, 1917.

Application filed October 2, 1916. Serial No. 123,401.

*To all whom it may concern:*

Be it known that I, BENJAMIN W. WEATHERSPOON, a citizen of the United States, residing at Snyder, in the county of Kiowa and State of Oklahoma, have invented certain new and useful Improvements in Harrows; and I do declare the following to be a full, clear, and exact description of the invention, such as will enable others skilled in the art to which it appertains to make and use the same.

This invention relates generally to agricultural implements, but more particularly to certain new and useful improvements in harrows.

The principal object of the invention is to provide an improved means for yieldably supporting the rotating tooth carrying member of a revolving harrow, and at the same time providing an improved means for driving said member.

A second object of the invention is to generally improve upon devices of this character by the provision of a device which will be comparatively simple, strong, durable, and inexpensive in construction, efficient and reliable in operation, and well adapted to the purpose for which it is designed.

With these and numerous other objects in view, the invention consists of certain novel features of construction and the combination and arrangement of parts as will be hereinafter fully described and claimed.

The accompanying drawings illustrate the preferred manner in which a device may be constructed in accordance with this invention, wherein:

Figure 1 is a top plan view thereof;

Fig. 2 is a side elevation of the same; and

Fig. 3 is a vertical longitudinal sectional view through the device taken on the plane of the line 3—3 of Fig. 1.

Referring more particularly to the drawings, the reference character 1 designates an open rectangular frame composed of side bars 2 and 3 and end bars 4 and 5, the latter being connected to the ends of said bars 2 and 3 in any suitable manner. Arranged between the side bars 2 and 3 and secured thereto at their ends are suitable transverse bars 6 and 7, the latter being spaced a short distance from the forward end of the frame 1, and being spaced apart by a distance substantially equal to the distance between the forward bar 7 and the front of the frame, as clearly shown by the drawings. The distance between the rear bar 6 and the rear end of the frame 1 is substantially one-half the length of the frame, the purpose of which will be obvious from the hereinafter described structure mounted with respect to the same.

Arranged between the end bar 5 and the transverse bar 6 and secured thereto in any convenient manner is a longitudinally extending bar 8, the latter being spaced midway of the width of the frame 1, and having a bearing 9 arranged intermediate its ends for rotatably supporting an upright shaft 10. This shaft 10 is here shown as being square-shape in cross section and having a head 11 at its lower end to limit the downward movement of a tooth carrying member 12. Surrounding the shaft 10 and having its lower end bearing against the upper side of the member 12 is a coiled spring 12', whereby to provide a yieldable supporting means for the same, it being understood that said member 12 is slidably mounted with respect to the shaft 10. This member 12 comprises a hub portion 13 having a square-shape bore extending therethrough for receiving said shaft 10 to prevent said member from rotating upon the latter, and extending radially from the hub portion 13 are arms 14, the latter being connected at their free ends by a circular ring 15. The arms 14 may be, if desired, braced by a second ring 16, the latter being smaller in size than the ring 15 and being secured to the arms 14 at portions intermediate their ends. As shown clearly in Fig. 1 of the drawings, the arms 14 are provided with a plurality of harrow teeth 17.

The means for driving the rotating member 12 comprise a bevel gear 18 fixed in a convenient manner to the upper end of the shaft 10, said gear 18 meshing with a bevel pinion 19 at the rear end of a shaft 20, the latter extending longitudinally of the frame 1, and being revolubly mounted in suitable bearings thereon. The forward end of the shaft 20 is provided with a bevel pinion 21 which meshes with a bevel gear 22 carried by the axle 23 of a pair of traction wheels 24. These traction wheels 24 are arranged near the opposite ends of the axle 23 and are disposed near the forward end of the frame 1. By this construction it may be seen that when the traction wheels 24 are allowed to travel over the ground they will be rotated, and through the medium of the several gears and pinions and shaft 20, will impart a rotating motion to the shaft 10 and tooth carrying member 12.

The side bars 2 and 3 of the frame are provided with pairs of vertically extending longitudinally spaced openings 25, which receive the upwardly extending arms 26 of a pair of U-shaped supporting members 27. These arms 26 are provided with a series of transversely extending apertures adapted to be alined with openings arranged in the side bars 2 and 3 to receive suitable pins or bolts 28, whereby said members are retained in their vertical adjusted positions. The members 27 are provided with bearings in which are journaled a pair of transversely extending shafts 29 and 30, to which are attached a plurality of disks 31. It is here to be noted that the number of shafts is immaterial, as obviously more or less may be provided without departing from the scope of the invention.

Rotatably mounted at the forward and rear ends of the frame 1 in suitable bearings attached to the side bars 2 and 3 are transverse shafts 32 and 33 respectively, the ends of which are provided with laterally extending L-shaped runners 34, while their intermediate portions are provided with arms 35, the latter extending laterally with respect to said shafts and in a direction opposite to that to which the runners extend. The forward end of the longitudinal bar 8 is provided with a quadrant rack 36 having a cross bar thereon to which a lever 37 is fulcrumed intermediate its ends. The lower free end of this lever 37 is pivotally connected to one of the ends of a pair of rods 38 and 39 respectively, the other ends of which are similarly connected to the free ends of the arms 35. It may be seen by this construction that whenever the lever 37 is moved forwardly or backwardly, the shafts 32 and 33 will be rocked so as to bring the runners 34 into operative and inoperative positions.

The forward end of the frame 1 is provided with suitable means for connection to draft animals or apparatus for drawing the same over the ground.

As the device is drawn over the ground, it being understood that the runners 34 are in their inoperative positions, the traction wheels 24 will be rotated so as to cause the tooth carrying member 12 to be rotated, such movement effecting pulverizing of the soil. The disks 31, being arranged in advance of the tooth carrying member 12, serve to cut the surface of the ground into comparatively small portions or lumps, whereby to prepare the soil for the pulverizing step. When it is desired to remove the device from the field, without throwing the disks or harrow teeth into operation, the lever 37 is drawn forwardly, which in turn rocks the shafts 32 and 33 so as to bring the free ends of the runners 34 into a plane disposed a short distance below the plane of the ends of the harrow teeth, these teeth being the lowest part of the machine. When in this position, the runners will travel over the ground and maintain the disks and harrow teeth out of contact with the same.

From the foregoing description, taken in connection with the accompanying drawings, the construction and operation of the device will be readily understood without a more extended explanation.

As numerous changes in form, proportion and the minor details of construction may be resorted to without departing from the spirit of this invention, I do not wish to be limited to the construction herein shown and described other than that set forth in the claim hereinto appended.

I claim:

A device of the class described comprising a rectangular frame, a transverse axle provided with ground wheels revolubly mounted at the forward end of said frame, a vertically extending bearing mounted upon said frame at a point near the rear end thereof and midway of the width of the same, an upright shaft revolubly mounted at its upper end in said bearing and depending below said frame, a head upon the lower end of said upright shaft, a horizontal circular tooth-carrying member slidably but non-rotatably mounted upon the lower end of said upright shaft and resting upon said head, longitudinally alined bearings mounted upon the lower side of said frame midway of the width thereof, a longtiudinal shaft revolubly mounted in said alined bearings, gears fixed upon said shafts and said axle, the gear upon said upright shaft being at a point near the upper end thereof, and a coiled spring surrounding said upright shaft and having its opposite ends bearing upon the last mentioned gear and said tooth-carrying member for normally holding the latter against said head.

In testimony whereof I have hereunto set my hand in the presence of two subscribing witnesses.

BENJAMIN W. WEATHERSPOON.

Witnesses:
J. O. VERNON,
EARL PARTLAND.

Copies of this patent may be obtained for five cents each, by addressing the "Commissioner of Patents, Washington, D. C."